United States Patent
Guo et al.

(10) Patent No.: US 11,799,379 B2
(45) Date of Patent: Oct. 24, 2023

(54) CONTROL CIRCUIT, SYSTEM AND METHOD FOR SWITCHED-MODE POWER SUPPLY

(71) Applicant: SHANGHAI BRIGHT POWER SEMICONDUCTOR CO., LTD., Shanghai (CN)

(72) Inventors: Yanmei Guo, Shanghai (CN); Yihui Chen, Shanghai (CN); Haifeng Miao, Shanghai (CN); Yuehui Li, Shanghai (CN); Xiaoru Gao, Shanghai (CN); Zhen Zhu, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 123 days.

(21) Appl. No.: 17/555,096

(22) Filed: Dec. 17, 2021

(65) Prior Publication Data
US 2022/0209673 A1    Jun. 30, 2022

(30) Foreign Application Priority Data

Dec. 31, 2020   (CN) .......................... 202011625428.7

(51) Int. Cl.
*H02M 3/335* (2006.01)
*H02M 1/00* (2006.01)
*H02M 3/158* (2006.01)

(52) U.S. Cl.
CPC ..... *H02M 3/33507* (2013.01); *H02M 1/0032* (2021.05); *H02M 3/158* (2013.01)

(58) Field of Classification Search
CPC ........... H02M 3/33507; H02M 1/0032; H02M 3/158; H02M 1/0054
See application file for complete search history.

(56) References Cited

U.S. PATENT DOCUMENTS

| | | | |
|---|---|---|---|
| 2010/0008109 A1* | 1/2010 | Morota | H02M 3/33523 363/21.16 |
| 2015/0194896 A1* | 7/2015 | Staler | H02M 3/01 363/21.02 |

* cited by examiner

*Primary Examiner* — Adolf D Berhane
*Assistant Examiner* — Afework S Demisse
(74) *Attorney, Agent, or Firm* — Muncy, Geissler, Olds & Lowe, P.C.

(57) ABSTRACT

A control circuit, system and method for switched-mode power supply are disclosed, the control circuit is for driving a first switch to convert an input voltage into an output voltage. The control circuit includes an on-time control unit, which receives a first signal characterizing switching frequency of first switch and a second signal characterizing current flowing through first switch and responsively generates a signal indicative of a turn-off instant for first switch. When a peak value of the current flowing through the first switch drops below a predefined value, the on-time control unit determines the turn-off instant for the first switch based on the first signal so that the switching frequency of the first switch is maintained at a target frequency. This design can effectively avoid the generation of audible noise, stabilize the output voltage against loading changes while maintaining desirable efficiency, and ensure operational safety of the switched-mode power supply.

21 Claims, 7 Drawing Sheets

CONTROL CIRCUIT, SYSTEM AND METHOD FOR SWITCHED-MODE POWER SUPPLY

CROSS-REFERENCES TO RELATED APPLICATION

This application claims the priority of Chinese patent application number 202011625428.7, filed on Dec. 31, 2021, the entire contents of which are incorporated herein by reference.

TECHNICAL FIELD

The present invention relates to the field of electronic circuits, and particularly to a control circuit, control method and system for a switched-mode power supply.

BACKGROUND

In the field of switched-mode power supplies, the currently common control methods include voltage control, current control, and constant on-time (COT) control. Among these, COT control is particularly extensively used thanks to its excellent transient load response and simple circuit structure. Conventionally, COT control turned on a transistor switch when an output voltage of the switched-mode power supply was lower than a reference signal and turned the transistor switch off upon the expiry of a predetermined on-time period. The conventional COT control for switched-mode power supplies featured a lower switching frequency at lighter loading, which might enter the audio range (e.g., 200 Hz-20 kHz) and thus introduce audible noise. Moreover, an increased input voltage could raise a current flowing through the COT-controlled transistor switch to an excessive level. Therefore, there is a need for new control circuits and methods capable of avoiding audible noise while maintaining desirable operating efficiency and safety.

SUMMARY OF THE INVENTION

It is an objective of the present invention to provide a control circuit, method and system for a switched-mode power supply, which can avoid the generation of audible noise that is audible by human ears due to a loading change during operation of the switched-mode power supply, reduce switching loss of the switched-mode power supply, limit a peak current flowing through a transistor switch and enhance performance of the switched-mode power supply.

A control circuit of a switched-mode power supply for driving a first switch in the switched-mode power supply to convert an input voltage into an output voltage according to an embodiment of the present invention is characterized in including an on-time control unit, which receives a first signal characterizing a switching frequency of the first switch and a second signal characterizing a current flowing through the first switch and responsively generates a signal indicative of a turn-off instant for the first switch. When a peak value of the current flowing through the first switch drops below a predefined value, the on-time control unit determines the turn-off instant for the first switch based on the first signal so that the switching frequency of the first switch is maintained at a target frequency.

In one embodiment, when the peak value of the current flowing through the first switch reaches the predefined value, the on-time control unit may determine the turn-off instant for the first switch based on the instant of time when the peak value of the current reaches the predefined value.

In one embodiment, the on-time control unit may include an adaptive on-time generator, which receives the first signal and a reference frequency signal and generates an adaptive on-time signal based on a difference between the reference frequency signal and the first signal.

In one embodiment, the control circuit may further include an off-time control unit, which receives a third signal characterizing the output voltage, compares the third signal with a reference voltage signal, and generates a signal indicative of a turn-on instant for the first switch.

In one embodiment, when the switching frequency is higher than the target frequency, the adaptive on-time generator may postpone the turn-off instant for the first switch by one unit interval. When the switching frequency is lower than the target frequency, the adaptive on-time generator may advance the turn-off instant for the first switch by one unit interval.

A control system for a switched-mode power supply according to an embodiment of the present invention includes a switching element, a freewheeling element and an energy storage element and is used to convert an input voltage into an output voltage. The control system is characterized in further including an on-time control unit, which receives a first signal characterizing a switching frequency of the switching element and a second signal characterizing a current flowing through the switching element or the energy storage element and responsively generates a signal indicative of a turn-off instant for the switching element. When a peak value of the current flowing through the switching element or the energy storage element drops below a predefined value, the on-time control unit determines the turn-off instant for the switching element based on the first signal so that the switching frequency of the switching element is maintained at a target frequency.

In one embodiment, the switched-mode power supply may be an isolated switched-mode power supply including a primary-side circuit and a secondary-side circuit, which are connected to different ground terminals, wherein the switching element and the on-time control unit are both electrically connected to the primary-side circuit, and the freewheeling element is connected to the secondary-side circuit.

In one embodiment, the on-time control unit may further include an adaptive on-time generator, a current limiter and a second logic circuit. The switched-mode power supply may be an isolated switched-mode power supply including a primary-side circuit and a secondary-side circuit, which are connected to different ground terminals, wherein the switching element, the current limiter and the second logic circuit are all electrically connected to the primary-side circuit, and the adaptive on-time generator is connected to the secondary-side circuit.

A control method for a switched-mode power supply for driving a first switch in the switched-mode power supply to convert an input voltage into an output voltage the control method according to an embodiment of the present invention is characterized in including: detecting a switching frequency of the first switch and a current flowing through the first switch; when a peak value of the current flowing through the first switch drops below a predefined value, causing the first switch to operate in a frequency-locked mode; and in the frequency-locked mode, determining a turn-off instant for the first switch by an on-time control unit based on a first signal so that the switching frequency of the first switch is maintained at a target frequency.

In one embodiment, when the peak value of the current flowing through the first switch reaches the predefined value, the turn-off instant for the first switch may be determined based on the instant of time when the peak value of the current reaches the predefined value.

In one embodiment, an adaptive on-time signal may be generated based on a difference between a reference frequency signal corresponding to the target frequency and the first signal.

In one embodiment, the control method may further include:
   receiving a second signal and the predefined value and generating a current limiting signal when the peak value of the current flowing through the first switch reaches the predefined value; and
   if the adaptive on-time signal is generated earlier than the current limiting signal, determining the turn-off instant for the first switch based on the adaptive on-time signal.

According to embodiments of the present invention, under heavy loading conditions, a frequency modulation control mode is activated in which the switching frequency is lowered in response to any decrease in loading and an on-time length of the switch is determined based on a current flowing through the switching element/energy storage element. When the switching frequency drops into the audio range, operation is switched to a frequency-locked mode in which the switch's on-time length is adaptively adjusted to maintain the switching frequency at a predetermined value above the audio range, thus effectively avoiding the generation of audible noise. In the frequency-locked mode, the switch's on-time duration is adjusted in adaptation to various loading conditions to keep the switching frequency substantially constant and ensure that the current flowing through the switch does not exceed a preset value. Under even lighter loading conditions that bring the on-time length to or below its lower limit, operation is switched back to the frequency modulation control mode to further reduce switching loss and achieve improved efficiency. Although this makes it possible for the switching frequency to lie in the audio range, since little energy is present in the switched-mode power supply system under light loading, the generation of noticeable noise can be still avoided, ensuring good user experience. In this way, the generation of audible noise can be effectively avoided under all loading conditions, and high efficiency and operational safety of the switched-mode power supply can be ensured.

DETAILED DESCRIPTION

An overvoltage protection circuit and method and a switched-mode power supply proposed in the present invention will be described in detail below by way of specific embodiments with reference to the accompanying drawings. Advantages and features of the present invention will become more apparent from the following description. Note that the figures are provided in a very simplified form not necessarily drawn to exact scale for the only purpose of helping to explain the embodiments disclosed herein in a more convenient and clearer way. It is to be also noted that the phrases "time", "on-time length" and "on-time" all refer to a duration or length of time, and the phrases "instant", "at the time of . . . " and "turn-off instant" all refer to a time point, i.e., an instant of time when a certain event takes place. The phrase "a given signal indicative of . . . " refers to a non-zero electrical level that indicates a certain component or module to take a corresponding action. The phrase "the arrival of . . . signal" means that an effective level of a given signal is received by a module or unit.

Figure 1:
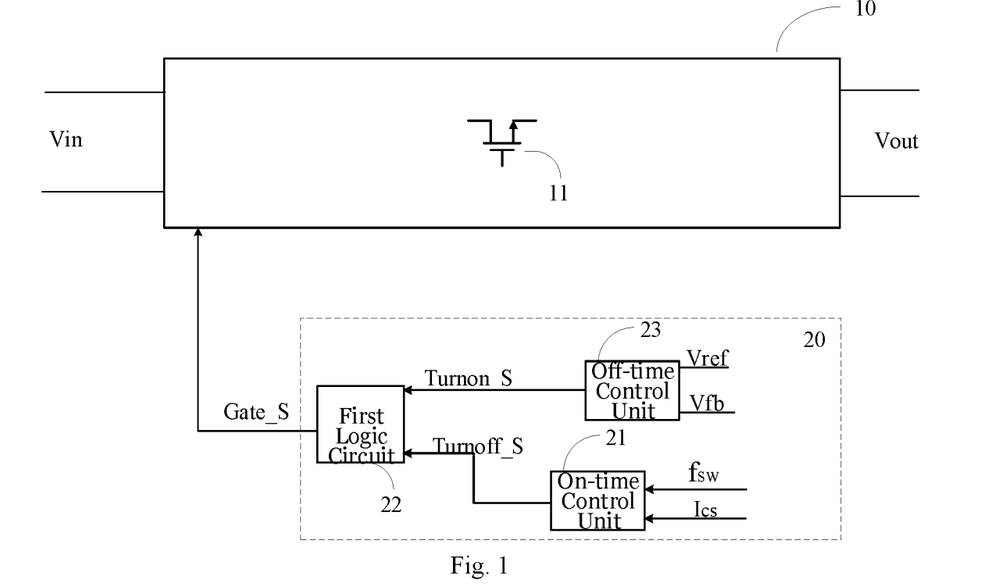
FIG. 1 is a structural schematic diagram of a control circuit according to an embodiment of the present invention.

FIG. 1 illustrates a conceptual diagram of a control circuit according to an embodiment of the present invention. The control circuit 20 is used to control a switched-mode power supply 10 including a first switch 11 and to convert an input voltage Vin into an output voltage Vout for driving a load (not shown) by turning on and off the first switch 11. The switched-mode power supply 10 may be an isolated/non-isolated AC/DC converter intended to output a substantially constant output voltage Vout. Alternatively, the switched-mode power supply 10 may be an isolated/non-isolated DC-DC converter also intended to output a substantially constant output voltage Vout. The control circuit includes: an on-time control unit 21 for generating a signal Turnoff_S indicative of a turn-off instant for the first switch; an off-time control unit 23 for generating a signal Turnon_S indicative of a turn-on instant for the first switch; and a first logic circuit 22. The on-time control unit 21 receives a first signal $f_{SW}$ characterizing a switching frequency of the first switch and a second signal $I_{CS}$ characterizing a current flowing through the first switch. Based on an detection of the magnitude of the second signal $I_{CS}$, when a peak value of the current flowing through the first switch is smaller than a predefined current value, the on-time control unit 21 determines the turn-off instant for the first switch according to the first signal $f_{SW}$ to maintain the switching frequency of the first switch substantially constant at a target frequency. As an example, in a heavy loading condition (leading to a large output current from the switched-mode power supply), the current flowing through the first switch is relatively large. At this point, the control circuit 20 can ascertain the heavy loading condition by performing a detection on the second signal $I_{CS}$ characterizing the current flowing through the first switch and responsively identify a need to limit the load current. Adaptiveness to such loading conditions is accomplished by frequency modulation control in which the switching frequency is reduced in response to any decrease in loading, reducing the energy delivered to the output side. However, when the load decreases below a predetermined value, the switching frequency of the control circuit 20 is lowered to and maintained at a predetermined reference frequency, e.g., within the range of 22-28 kHz, in order to avoid audible noise. Specifically, the on-time control unit 21 may adjust the turn-off instant for the first switch 11 and hence an on-time duration thereof to satisfy a load change while maintaining a constant switching frequency in steady-state operation. Moreover, the signal Turnon_S indicative of the turn-on instant for the first switch is determined by the off-time control unit 23 based on a detected feedback voltage signal Vfb reflecting the output voltage Vout and a predefined reference voltage Vref. The first logic circuit 22 generates a control signal Gate_S for turning on or off the first switch 11 by processing the signal Turnon_S or Turnoff_S. In some embodiments of the present invention, the off-time control unit 23 may determine the turn-on instant for the first switch 11 alternatively based on a fixed-frequency short pulse signal or any other detected signal that can suitably reflect the output voltage Vout. In some embodiments of the present invention, the switching frequency signal $f_{SW}$ may originate from the control signal Gate_S for the first switch 11, the signal Turnon_S indicative of the turn-on instant for the first switch, or a combination of the two.

The following equations that describe the principles of the control circuit of the present invention help more clearly explain the beneficial effects of the circuit. In a particular example where the circuit is a buck-type one, the current Ipeak through the first switch may be expressed as:

$$Ipeak = \frac{Vin}{L} Ton,$$

where L represents an inductor configured to store energy in the switched-mode power supply, and Ton is an on-time duration within one period of the first switch 11.

This is combined with an energy transfer expression of the switched-mode power supply to give:

$$Po = Vout * Io = \frac{1}{2} L Ipeak^2 f = \frac{1}{2} L \left(\frac{Vin}{L} Ton\right)^2 f,$$

where Po represents energy provided by the switched-mode power supply to the load, which is the product of the output voltage Vout and the load current Io, and f represents the switching frequency of the first switch 11.

As can be seen from the above expression, given a fixed switching frequency f, rapid response to any loading change, as well as effective avoidance of the generation of audible noise, can be achieved by adjusting the switch's on-time Ton. Coupled with frequency modulation control under heavy loading conditions, desirable efficiency can be maintained under all loading conditions, resulting in improved overall performance of the switched-mode power supply.

Figure 2:
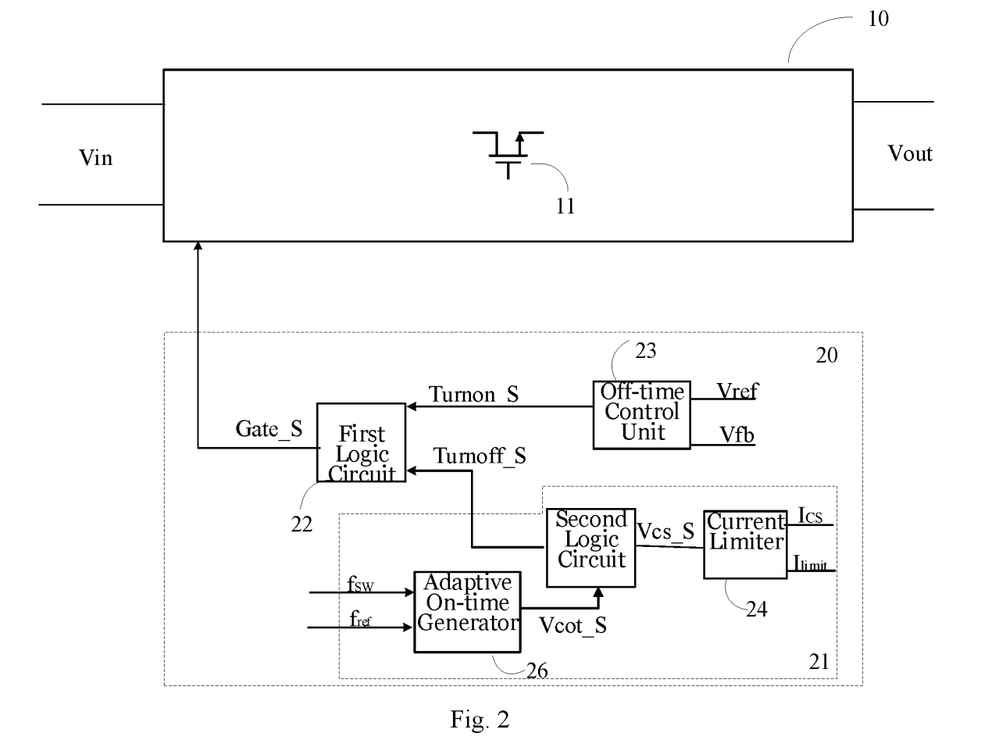
FIG. 2 is a structural schematic of the control circuit according to another embodiment of the present invention.

A method of adjusting the switch's on-time length according to another embodiment of the present invention will be described below with reference to FIG. 2. As shown, when the peak value of the current flowing through the first switch drops below the predefined value, the on-time control unit 21 adjusts the turn-off instant for the first switch based on the first signal $f_{SW}$ and a predefined reference signal $f_{ref}$ to substantially maintain the switching frequency of the first switch at the target frequency. The reference signal $f_{ref}$ may characterize a reference frequency, for example, the frequency or a period corresponding to the frequency. The signal may be either set inside the control circuit or introduced via an external port, depending on the needs of practical applications. The on-time control unit 21 may include an adaptive on-time generator 26 configured to output, based on a difference between the reference frequency and the switching frequency, a signal Vcot_S for adaptively changing the turn-off instant for the first switch 11. The on-time control unit 21 may further include a current limiter 24 and a second logic circuit 25. The current limiter 24 may receive the second signal $I_{CS}$ and a reference current signal $I_{limit}$, and if the peak value of the current flowing through first switch is smaller than a reference current represented by $I_{limit}$, instruct the second logic circuit by means of a signal Vcs_S to change the turn-off instant for the first switch based on the signal Vcot_S output from the adaptive on-time generator 26.

Specifically, in some embodiments of the present invention, based on the difference between the reference frequency and the switching frequency, the adaptive on-time generator 26 may change the turn-off instant (and hence the on-time) for the first switch 11 in a cycle-by-cycle way. For example, when the switching frequency is higher than the reference frequency, the adaptive on-time generator may postpone the turn-off instant for the first switch by one unit interval. When the switching frequency is lower than the reference frequency, the adaptive on-time generator may advance the turn-off instant for the first switch by one unit interval. In this way, smoothness of on-time adjustment can be maximized, allowing the switched-mode power supply to operate in a stable manner. In some other embodiments of the present invention, based on the difference between the reference frequency and the switching frequency, the adaptive on-time generator 26 may change the turn-off instant (and hence the on-time) for the first switch 11 in a cycle-by-cycle way, wherein the adjustment of on-time is in proportion to the difference between the reference frequency and the switching frequency. For example, when the switching frequency is higher than the reference frequency, the adaptive on-time generator 26 may postpone the turn-off instant for the first switch by a period of time in proportion to the difference between the reference frequency and the switching frequency. When the switching frequency is lower than the reference frequency, the adaptive on-time generator 26 may advance the turn-off instant for the first switch by a period of time in proportion to the difference between the reference frequency and the switching frequency. In this way, the switch's on-time adjustment can be speeded up, resulting in improved performance of the switched-mode power supply. Of course, the adaptive on-time generator 26 may also adjust the switch's on-time once every several periods, as may be required in practice, and may be configured to do so by the on-time control unit 21. As a result, in steady-state operation of the switched-mode power supply 10, the switching frequency of the first switch is maintained at the reference frequency, effectively avoiding the generation of audible noise.

Figure 3:
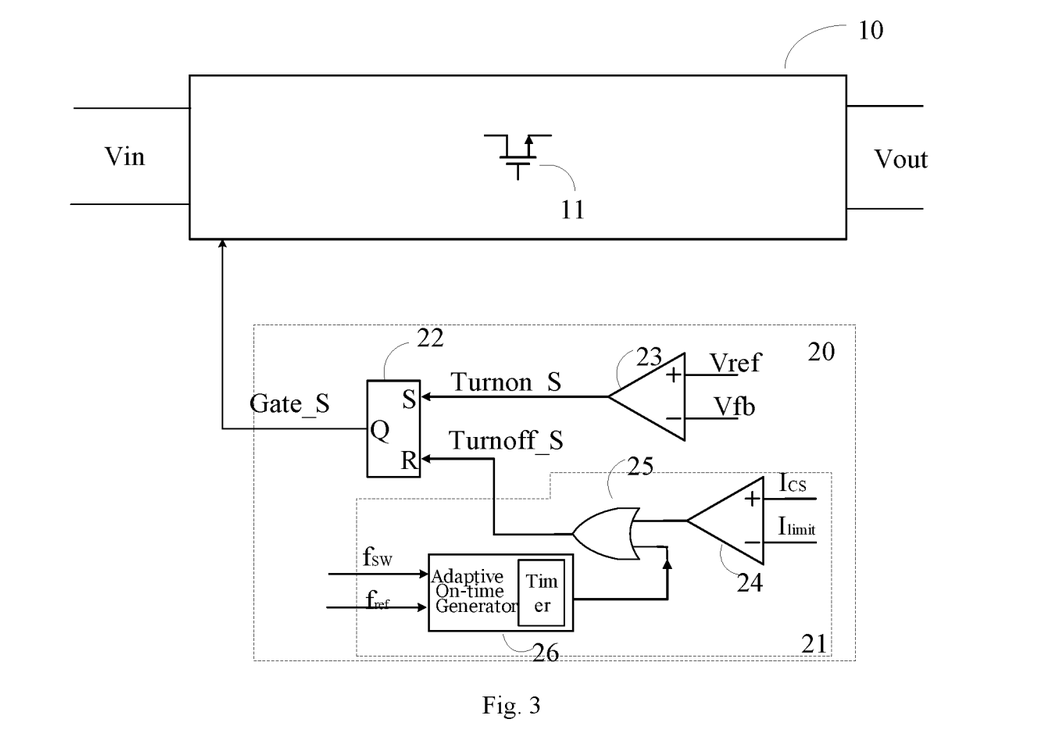
FIG. 3 is a structural schematic of the control circuit according to a further embodiment of the present invention.

An exemplary embodiment of the control circuit of the present invention will be described in detail below with reference to FIG. 3. As shown in FIG. 3, in a further embodiment of the present invention, the current limiter 24 may be implemented as a comparator having a positive input coupled to the second signal $I_{CS}$ and a negative input coupled to the reference current signal $I_{limit}$. If the current flowing through the first switch is smaller than the reference current represented by $I_{limit}$, the output signal Vcs_S of the current limiter 24 (see FIG. 2) may be set at low level. Otherwise, it may be set at high level. The second logic circuit 25 may be implemented as a logic OR gate as shown in FIG. 3, as multiple logic devices that are combined together to function as an OR gate, or as a selection circuit under the control of the signal Vcs_S, so that when the peak value of the current flowing through the first switch is smaller than the reference current, the output signal Turnoff_S of the second logic circuit 25 changes based on the output signal Vcot_S of the adaptive on-time generator 26 (see FIG. 2), which in turn causes a change in the turn-off instant for the first switch. As shown in FIG. 3, in one embodiment, the second logic circuit 25 may be implemented as a logic OR gate. In this case, the output signal Vcs_S of the current limiter 24 may be provided to an input of the OR gate, and the output signal Vcot_S of the adaptive on-time generator 26 may be provided to another input of the OR gate. When the output signal Vcs_S of the current limiter 24 is high, i.e., when the current flowing through the first switch surpasses the reference current, the OR gate 25 may output a high level that turns off the first switch, and the output signal of the adaptive on-time generator 26 cannot cause a change in the output signal of the OR gate. When the output signal Vcs_S of the current limiter 24 is low, i.e., when the current flowing through the first switch is smaller than the reference current, the OR gate 25 may output a low level, and the output signal of the adaptive on-time generator 26 can change the output signal of the OR gate. Through introducing the current detection signal and controlling the turn-off instant for the first switch based on the results of current detection and comparison, the current flowing through the first switch is limited cycle-by-cycle, so the first switch and other components can be protected, in particular under heavy loading conditions.

Figure 4:
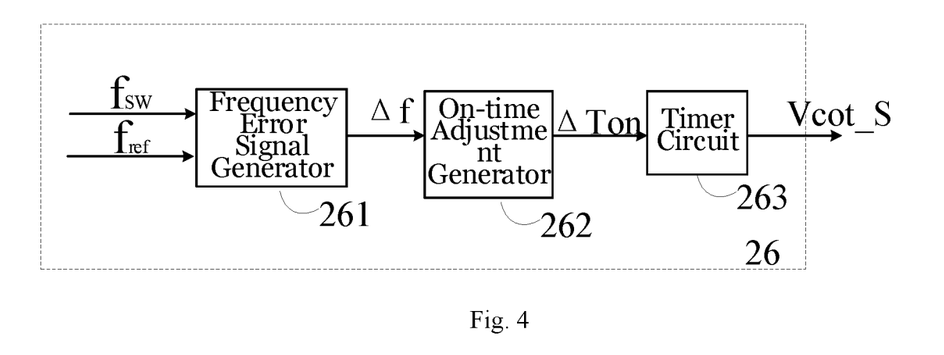
FIG. 4 is a structural schematic of an adaptive on-time generator according to an embodiment of the present invention.

Additionally, referring to FIG. 4, the adaptive on-time generator 26 may further include: a frequency error signal generator 261, which receives the first signal $f_{SW}$ and a reference frequency signal $f_{ref}$ and generate a frequency error signal $\Delta f$ characterizing a difference between the reference frequency signal and the first signal; an on-time adjustment generator 262, which receives the frequency error signal $\Delta f$ and generates, from the frequency error signal $\Delta f$, an amount of on-time adjustment $\Delta$Ton to be made for the current period; and a timer circuit 263 for changing the adaptive on-time signal Vcot_S based on the on-time adjustment $\Delta$Ton.

The adaptive on-time generator 26 may change the adaptive on-time signal Vcot_S based on the reference frequency signal $f_{ref}$ and the switching frequency signal $f_{SW}$ of the first switch 11 in particular by causing the timer to postpone the turn-off instant for the first switch by one unit interval when the switching frequency of the first switch is higher than the reference frequency and to advance the turn-off instant for the first switch by one unit interval when the switching frequency of the first switch is lower than the reference frequency. The unit interval may be determined by a timing increment set in the timer.

Figure 5:
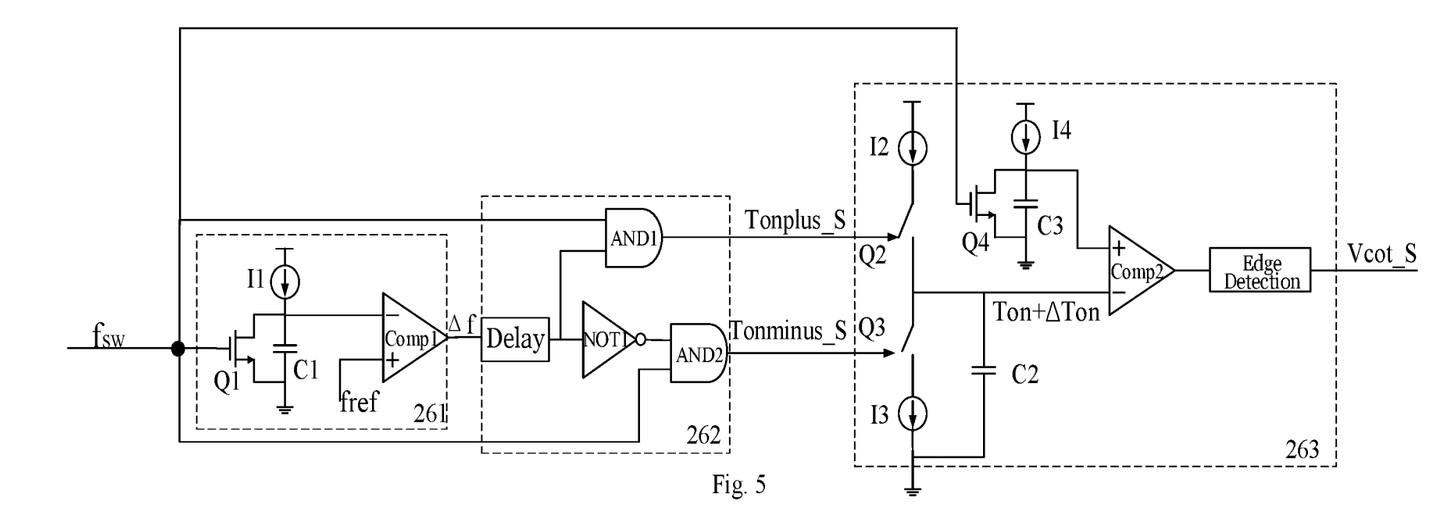
FIG. 5 is a schematic circuit diagram of the adaptive on-time generator according to an embodiment of the present invention.

In an exemplary embodiment of the present invention, there is provided a specific circuit implementation of the adaptive on-time generator 26, as shown in FIG. 5, in which the frequency error signal generator 261 includes a timing circuit consisting of a current source I1, a switch Q1 and a capacitor C1. The timing circuit receives the first signal $f_{SW}$ characterizing the switching frequency and generates, based thereon, a voltage signal corresponding to the switching frequency or switching period, which is output to a negative input of a comparator Comp1. A positive input of the comparator Comp1 receives a voltage signal corresponding to the reference frequency signal $f_{ref}$ or to a corresponding period thereof. The comparator Comp1 compares the signals received at inputs and generates, based on the comparison, the frequency error signal $\Delta f$ characterizing the difference between the reference frequency and the switching frequency. The on-time adjustment generator 262 includes a delay module, a NOT gate NOT1 and AND gates AND1 and AND2. Signals Tonplus_S and Tonminus_S generated from logical operations together indicate the amount of on-time adjustment $\Delta$Ton to be made for the current period. The signals Tonplus_S and Tonminus_S control current sources I2 and I3 respectively. The timer circuit 263 includes the current sources I2, I3, a comparator Comp2, a capacitor C2 and a timing circuit consisting of a current source I4, a switch Q4 and a capacitor C3. The timer circuit 263 is configured to change the adaptive on-time signal Vcot_S based on the amount of on-time adjustment $\Delta$Ton (controlled by the signals Tonplus_S and Tonminus_S in this embodiment). Specifically, when the switching frequency of the first switch is higher than the reference frequency, the signal Tonplus_S is high and turns on the switch Q2, and the signal Tonminus_S is low and turns off the switch Q3. As a result, a voltage on the capacitor C2 is raised and provided to a negative input of the comparator Comp2. At the same time, the first signal $f_{SW}$ causes the timing circuit consisting of the current source I4, the switch Q4 and the capacitor C3 to generate a voltage signal corresponding to the switching frequency, which is provided to a positive input of the comparator Comp2. An output signal of the comparator Comp2 is processed by edge detection and results in the generation of the signal Vcot_S consisting of a short pulse for postponing the turn-off instant for the first switch 11 by one unit interval. The unit interval is determined by how fast and how long the capacitor C2 is charged. That is, it is determined by pulse width of the signals Tonplus_S and Tonminus_S as well as magnitudes of currents from the current sources I2 and I3. In the case of the switching frequency of the first switch being lower than the reference frequency, the adaptive on-time generator 26 may operate in a similar way to advance the turn-off instant for the first switch by one unit interval.

The frequency error signal generator 261 and the timer circuit 263 may also be implemented by any other existing timing circuit, timer circuit or the like, such as a digitalized timing circuit. The on-time adjustment generator 262 may also be implemented by any other suitable combination of known logic or digital circuits, as long as the adaptive on-time generator 26 maintains the ability to adjust the turn-off instant for the first switch based on the difference between the switching frequency and the reference frequency, for example, by outputting a short pulse indicative of the turn-off instant for the first switch upon the expiry of an on-time period configured based on the difference between the switching frequency and the reference frequency. Such adaptive adjustment of the switch's on-time can fix the switching frequency at the predetermined value and thus effective avoid the generation of audible noise.

Figure 6:
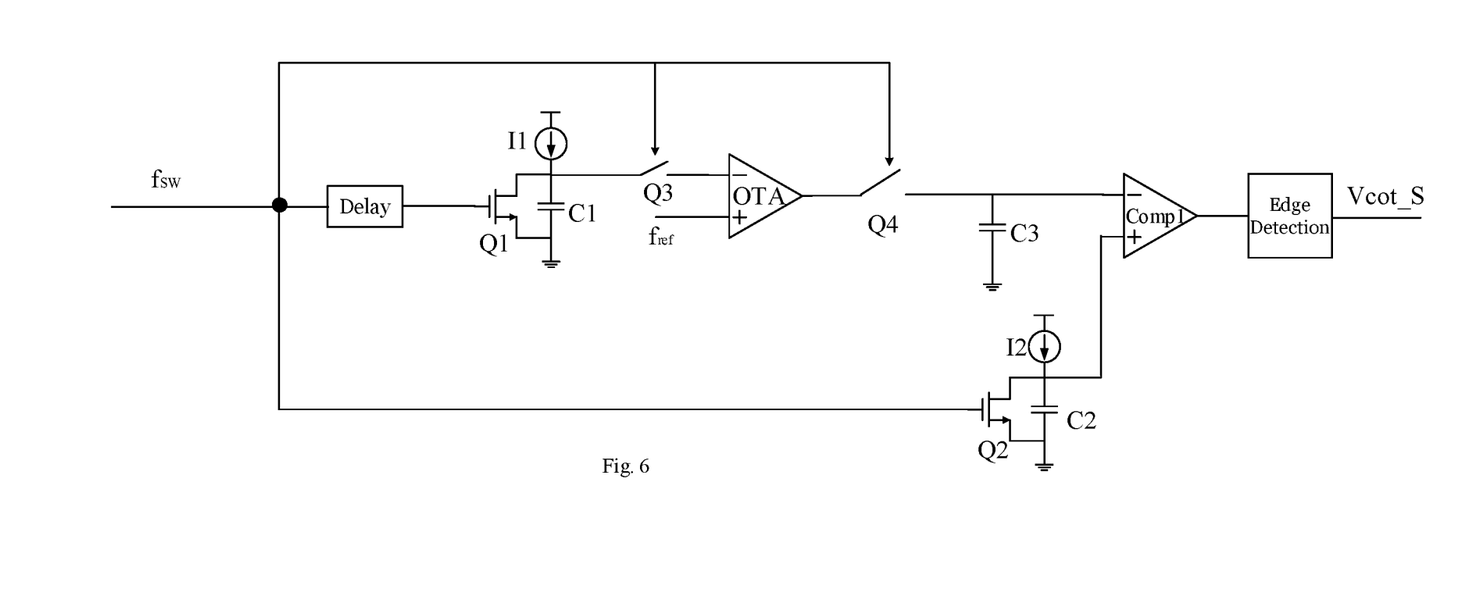
FIG. 6 is a schematic circuit diagram of the adaptive on-time generator according to another embodiment of the present invention.

FIG. 6 shows another specific circuit implementation of the adaptive on-time generator 26, which can positively correlate an amount of time that the turn-off instant for the first switch 11 is advanced or postponed to the difference between the switching frequency and the reference frequency. Specifically, as shown in FIG. 6, the adaptive on-time generator 26 may include a timing circuit consisting of a switch Q1, a capacitor C1 and a current source I1, which is configured to detect a voltage signal corresponding to the switching frequency in the previous switching period. This voltage signal is passed, together with a voltage signal corresponding to the reference frequency signal, through an operational transconductance amplifier (OTA), resulting in the generation of a current signal proportional to a difference between the two input voltage signals. The current signal is used to periodically charge a capacitor C3 via a switch Q4, and a voltage on the capacitor C3, which characterizes the sum of an amount of on-time adjustment ΔTon and the on-time Ton prior to the adjustment, is coupled to a negative input of a comparator Comp1. The amount of on-time adjustment ΔTon is proportional to the difference Δf between the switching frequency and the reference frequency. At the same time, the first signal $f_{SW}$ instructs a timing circuit consisting of a current source I2, a switch Q2 and a capacitor C2 to generate a voltage signal corresponding to the switching frequency and provides the voltage signal at a positive input of the comparator Comp1. An output signal of the comparator Comp1 is processed by edge detection and results in the generation of the signal Vcot_S consisting of a short pulse indicating the adjusted turn-off instant for the first switch 11.

With continued reference to FIG. 3, the control circuit of the present invention may further include an off-time control unit 23, which may be implemented as a comparator having a negative input that receives the feedback signal Vfb characterizing the output voltage Vout of the switched-mode power supply and a positive input that receives the reference voltage signal Vref, as shown in FIG. 3, and configured to compare the feedback signal Vfb with the reference voltage signal Vref. If the feedback signal Vfb is lower than the reference voltage signal Vref, the comparator 23 may output a high level that turns on the first switch 11 to cause the output voltage to increase. The off-time control unit may also be implemented by any other suitable combination of analog or logic circuits known to those skilled in the art, or receive any other suitable signal characterizing the output voltage Vout and perform the function of turning on the first switch 11 when the output voltage Vout is lower than an expected value.

As shown in FIG. 3, the first logic circuit 22 may be implemented as, for example, an RS latch. Specifically, the signal Turnon_S indicative of the turn-on instant for the first switch may be coupled to an S terminal of the RS latch, and the signal Turnoff_S indicative of the turn-off instant for the first switch may be coupled to an R terminal of the RS latch so that the control signal Gate_S for turning on or off the first switch 11 is generated at a Q output terminal of the RS latch. It is worth noticing that in the specific implementations of the adaptive on-time generator 26 shown in FIGS. 5 and 6, the edge detection circuit may be removed. In this case, the signal Vcot_S may consist of high and low levels, and appropriate processing may be carried out in the first logic circuit 22. For example, in the case of the first logic circuit 22 being implemented as the RS latch, the signal input to the S terminal may be taken as a primary trigger signal.

Figure 7:
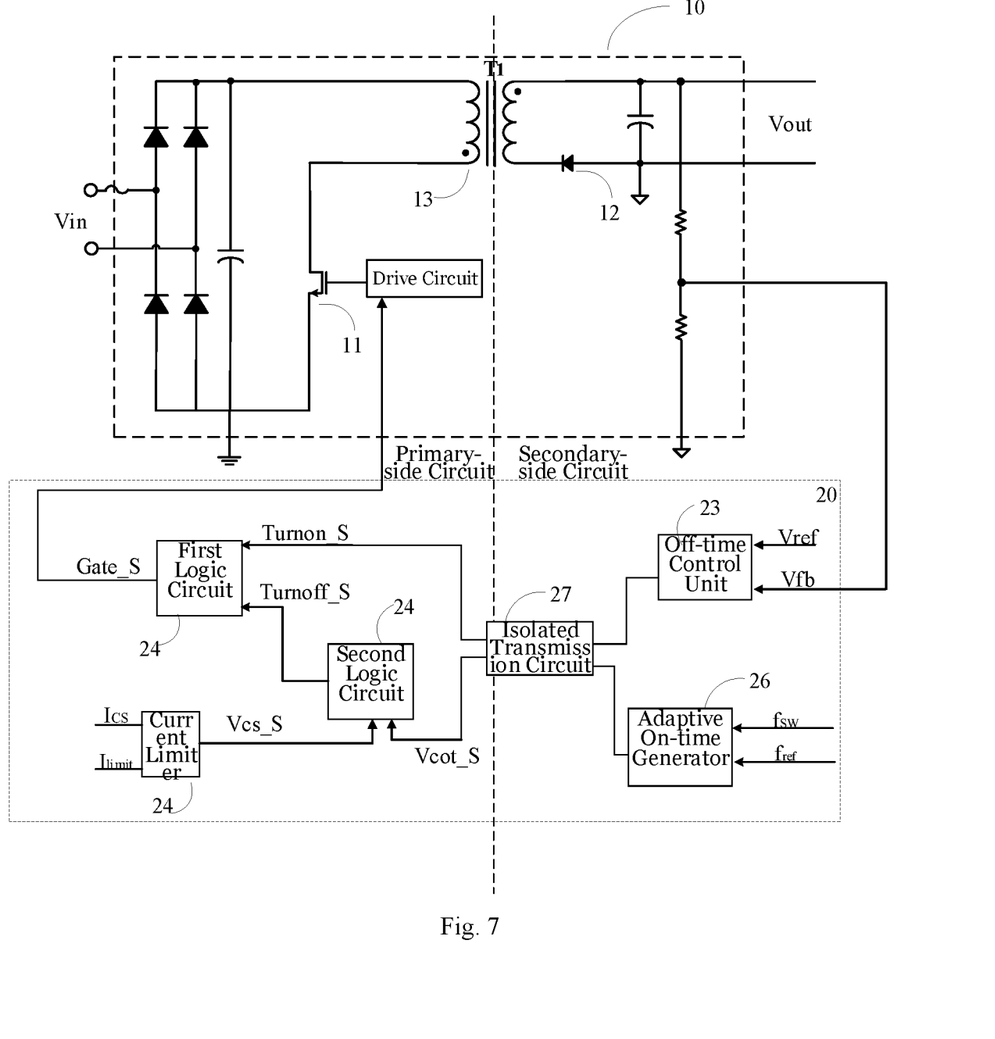
FIG. 7 is a structural schematic of a control system according to an embodiment of the present invention.

When used in a switched-mode power supply, the control circuit of the present invention as discussed above in connection with the foregoing embodiments may be configured in various ways and make up a control system together with the switched-mode power supply. As shown in FIG. 7, the control system includes a switching element (first switch) 11, a freewheeling element 12 and an energy storage element 13. For example, in the case of an isolated flyback converter, the on-time control unit 21 (including its components) and the first switch 11 may be both electrically connected to a primary-side circuit of the switched-mode power supply 10, and the off-time control unit 23 may be electrically connected to a secondary-side circuit of the switched-mode power supply 10. The signal Turnon_S for turning on the first switch generated by the off-time control unit 23 may be, for example, on-off-keying (OOK) modulated and transmitted in an isolated manner using electromagnetic coupling to the primary-side control circuit so as to work with the primary-side on-time control unit 21 to control the first switch 11. In some other embodiments, taking the example of the isolated flyback converter, as shown in FIG. 7 in which a dashed line marks a boundary between the primary-side and secondary-side circuits, the switching element 11 is connected to the primary-side circuit, and the freewheeling element 12 is a diode or switch connected to the secondary-side circuit, with the energy storage element 13 being implemented as a transformer T1 providing the isolation between the primary- and secondary-side circuits. The current limiter 24 and the second logic circuit 25 are electrically connected to the primary-side circuit, and the off-time control unit 23 and the adaptive on-time generator 26 are electrically connected to the secondary-side circuit. The off-time control unit 23 receives, from the secondary-side circuit, the signal Vfb characterizing the output voltage Vout and generates the signal Turnon_S for turning on the switching element 11. The signal Turnon_S is, together with the signal Vcot_S generated by the adaptive on-time generator 26, for example, OOK-modulated and transmitted in an isolated manner using, for example, electromagnetic coupling by an isolated transmission circuit 27 to the primary-side control circuit. The signal Vcot_S and the current limiter 24 work together under the control of the second logic circuit 25 to generate the signal Turnoff_S for turning off the switching element 11, which forms together with the signal Turnon_S transmitted to the primary-side circuit, the final control signal Gate_S for controlling operation of the switching element 11 via a drive circuit. In this configuration, every component configured for detection is arranged as near as possible to the signal source to be detected, resulting reduced interference from noise and enhanced signal detection and transmission reliability. The isolated transmission circuit 27 may separately modulate the signal Turnon_S generated by the off-time control unit 23 and the signal Vcot_S generated by the adaptive on-time generator 26, transmit them in an isolated manner to the primary-side circuit and then demodulate the signal Turnon_S. Alternatively, it may compose the signal Turnon_S generated by the off-time control unit 23 and the signal Vcot_S generated by the adaptive on-time generator 26 into one signal, modulate the composed signal, transmit it to the primary-side circuit in an isolated manner and then demodulate the composed signal. The composed signal may then be processed by rising edge detection and falling edge detection in the primary side circuit, resulting in the generation of proper signals for the following operation. Depending on the requirements of practical applications such as, for example, those on the signal chosen to be detected by the off-time control unit 23 or the current limiter 24, the components of the control circuit may be connected in a different manner in the isolated converter, and a different electromagnetic coupling means may be chosen for the isolated transmission circuit 27, such as, a coupling coil, capacitor, etc., and a detailed description thereof is omitted here. The switched-mode power supply 10 may be implemented as an isolated/non-isolated AC/DC converter configured to output a substantially constant output voltage Vout, or an isolated/non-isolated DC-DC converter also configured to output a substantially constant output voltage Vout. In addition, it is not limited to adopting a flyback or buck topology.

The control circuit provided in the above embodiments may be combined with one or more controlled switching elements to form a control system arranged in a single package in order to provide a higher degree of integration that is favorable to users and achieve reduced interference to the control signal. In this case, it works in the same or similar way as discussed above, and a duplicated description thereof is omitted here.

Figure 8:
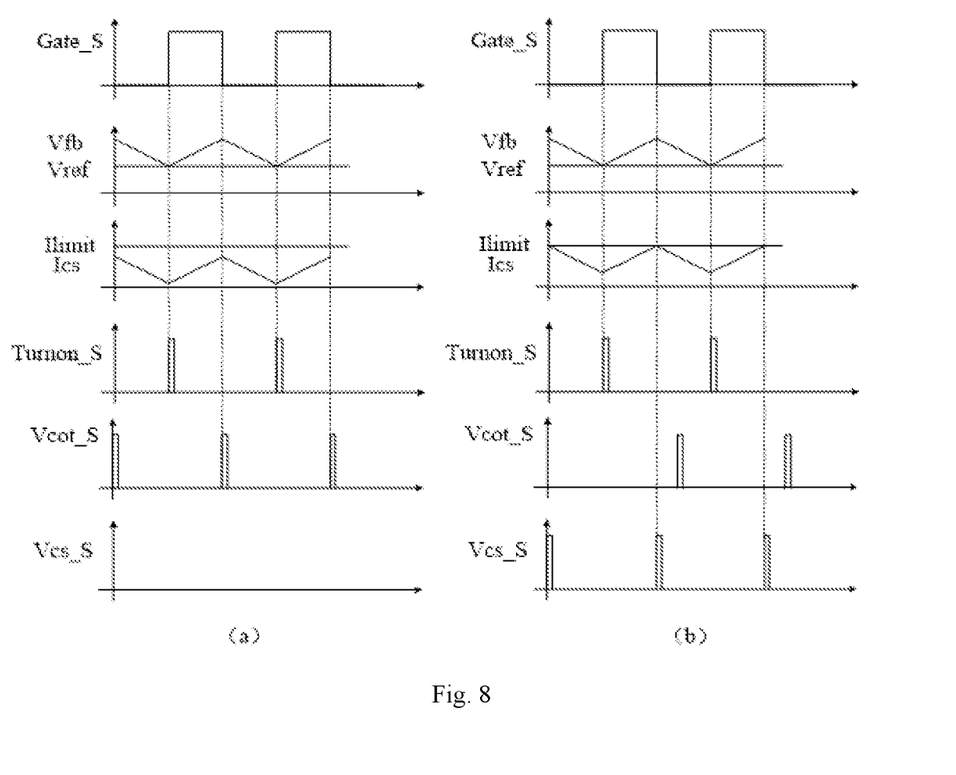
FIG. 8 schematically illustrates main waveforms according to an embodiment of the present invention.

FIG. 8 is a schematic diagram illustrating main waveforms according to an embodiment of the present invention. From FIGS. 8 and 1 to 3, working principles of the main signals can be more clearly understood. When the feedback signal Vfb is lower than reference voltage signal Vref, the signal Turnon_S is output from the off-time control unit 23 as a short pulse for turning on the first switch 11. The on-time control unit 21 has two possible modes of operation. As shown in FIG. 8(a), when the second signal $I_{CS}$ is smaller than the reference current signal $I_{limit}$, the output signal Vcs_S of the current limiter 24 allows the control signal Gate_S determines the turn-off instant for the first switch based on the output signal Vcot_S of the adaptive on-time generator 26. By contrast, as shown in FIG. 8(b), when the second signal $I_{CS}$ reaches the reference current signal $I_{limit}$, the signal Vcs_S is output from the current limiter 24 as a short pulse indicative of the turn-off instant for the first switch, which is the instant of time when the control signal Gate_S becomes low. It is worth noting that, under the operating condition shown in FIG. 8(b), the turn-off instant for the first switch indicated in the short pulse output from the adaptive on-time generator 26 as the signal Vcot_S is later than that indicated in the short pulse of the output signal Vcs_S. At this moment, the switch is already turned off, and the signal Vcot_S cannot cause a change in the instant of time when the control signal Gate_S becomes low. That is, when the peak value of the current flowing through the first switch reaches the reference current signal $I_{limit}$, the on-time control unit 21 determines the turn-off instant for the first switch based on the instant of time when the peak value of the current reaches the reference current value, and the adaptive on-time generator 26 cannot adjust the turn-off instant for the first switch under this condition.

Figure 9:
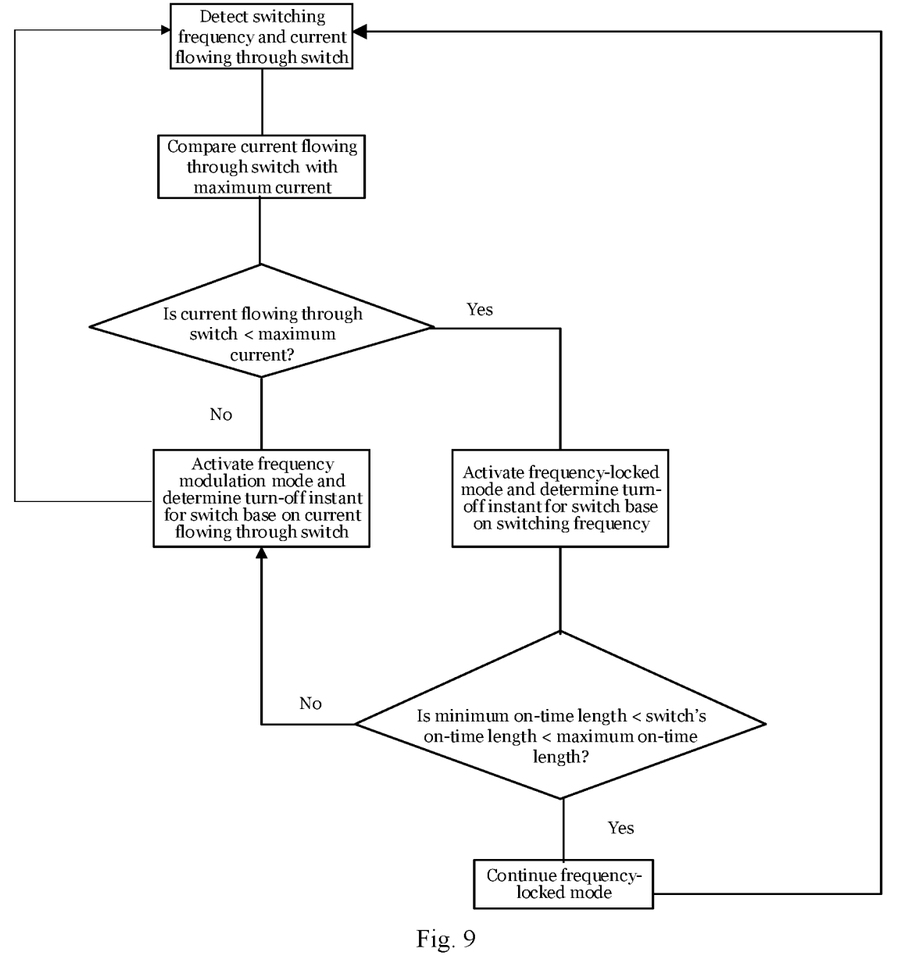
FIG. 9 is a flowchart of a control method according to an embodiment of the present invention.

As shown in FIG. 9, a method for controlling the switched-mode power supply according to an embodiment of the present invention includes the steps of:
  detecting the switching frequency of the first switch 11 and the current flowing through the first switch 11;
  when the peak value of the current flowing through the first switch 11 drops below the predefined value, causing the first switch 11 to operate in a frequency-locked mode;
  in the frequency-locked mode, controlling the turn-off instant for the first switch 11 based on the switching frequency of the first switch 11 so that the switching frequency of the first switch is kept substantially constant.

The control performed in the frequency-locked mode has been described in detail above, and a repeated description is omitted here. In the frequency-locked mode, the switching frequency is limited to a predetermined frequency above the audio range, for example, 25 kHz. In this way, the generation of audible noise during operation of the switched-mode power supply can be avoided. Moreover, the operation can be adapted to loading changes to ensure reliability and stability of the output voltage.

Furthermore, in the frequency-locked mode, the on-time length of the first switch may be detected, and if it is less than or equal to a predetermined minimum on-time length, the frequency-locked mode may be quitted, while the turn-off instant for the first switch may be maintained the same, for example, at the predetermined minimum on-time length. If the on-time length is greater than or equal to a maximum on-time length, the frequency-locked mode may be quitted, and the switching frequency may be then adjusted to a loading change. In this case, the on-time length may be determined based on a comparison between $I_{CS}$ and $I_{limit}$, for example, as shown in FIG. 8(b). If the on-time length is greater than the predetermined minimum on-time length and less than the maximum on-time length, the frequency-locked mode may be continued, and the on-time length may be adjusted based on a detection of the switching frequency signal $f_{SW}$ and the second signal $I_{CS}$ so as to maintain the switching frequency substantially constant. The maximum on-time length may be determined based on the intrinsic parameters of the device, the control circuit, or the like, or as corresponding to a period of time taken by an inductor current to rise to the reference current value at a given input voltage. It is worth noting that, under a very light loading condition in which there is only a very small current in the switched-mode power supply, it may happen that the on-time length in the frequency-locked mode is adjusted to or below the predetermined minimum on-time length. In this condition, it may be reasonable to switch operation from the frequency-locked mode to the frequency modulation control mode. In this case, although the switching frequency may drop into the audio range and audible noise may be generated, as there is only very little energy transferring in the switched-mode power supply system, the audible noise generated may be as insignificant as not noticeable by human ears. Thus, good user experience can be still ensured. Further, as switching loss under such conditions tends to be more significant than conduction loss, reducing the switching frequency is helpful in reducing loss and improving efficiency.

Figure 10:
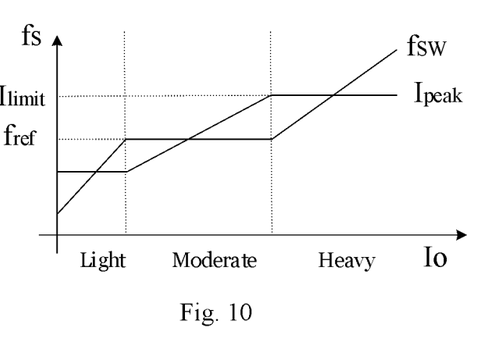
FIG. 10 schematically illustrates a current flowing through a switch and a corresponding switching frequency according to an embodiment of the present invention.

FIG. 10 schematically illustrates the current flowing through the switch and the corresponding switching frequency according to an embodiment of the present invention. This demonstrates a profile of the switching frequency under various loading conditions in use of the proposed control circuit and method in a switched-mode power supply. As can be seen from FIG. 10, under moderate loading conditions, the peak value Ipeak of the current flowing through the switch is smaller than the reference current signal $I_{limit}$, and the frequency-locked control mode is active to substantially maintain the switching frequency $f_{SW}$ at the predefined frequency $f_{ref}$. In the frequency-locked mode, when the switch's on-time length is excessively reduced, the switched-mode power supply is switched back to the frequency modulation control mode to maintain the current flowing through the circuit, i.e., the current provided to the load at a desirable level.

According to embodiments of the present invention, under heavy loading conditions, the frequency modulation control mode is activated in which the switching frequency is lowered in response to any decrease in loading while the on-time length of the switch is maintained the same. When the switching frequency drops into the audio range, the switched-mode power supply is switched to the frequency-locked mode in which the switch's on-time length is adaptively adjusted to keep the switching frequency at a predetermined value above the audio range, thus effectively avoiding the generation of audible noise. In the frequency-locked mode, the switch's on-time duration is adjusted in adaptation to various loading conditions to maintain the switching frequency substantially constant and ensure that the current flowing through the switch does not exceed a preset value. Under light loading conditions, the switched-mode power supply may be switched back to the frequency modulation control mode to further reduce switching loss and improve efficiency. Although it is possible for the switching frequency to lie in the audio range, since less energy is transferring in the switched-mode power supply system under light loading, the generation of noise that is noticeable by human ears can be still avoided, ensuring good user experience.

The embodiments disclosed herein are described in a progressive manner with the description of each embodiment focusing on its differences from others, and reference can be made between the embodiments for their identical or similar parts. Since the control system embodiments correspond to the control circuit embodiments, they are described relatively briefly, and reference can be made to the control circuit embodiments for details in the control system embodiments. Likewise, reference can be made to the control circuit embodiment and control system embodiment for details in the control method embodiments.

The foregoing description presents merely preferred embodiments of the present invention and is not intended to limit the scope of the present invention in any way. Any and all changes and modifications made by those of ordinary skill in the art in light of the above teachings without departing from the spirit of the present invention are intended to be embraced in the scope as defined by the appended claims.

What is claimed is:

1. A control circuit for a switched-mode power supply for driving a first switch in the switched-mode power supply to convert an input voltage into an output voltage, the control circuit comprising
   an on-time control unit, which receives a first signal characterizing a switching frequency of the first switch and a second signal characterizing a current flowing through the first switch and responsively generates a signal indicative of a turn-off instant for the first switch, wherein when a peak value of the current flowing through the first switch drops below a predefined value, the on-time control unit determines the turn-off instant for the first switch based on the first signal so that the switching frequency of the first switch is maintained at a target frequency.

2. The control circuit of claim 1, wherein when the peak value of the current flowing through the first switch reaches the predefined value, the on-time control unit determines the turn-off instant for the first switch based on an instant of time when the peak value of the current reaches the predefined value.

3. The control circuit of claim 1, wherein the on-time control unit comprises an adaptive on-time generator, which receives the first signal and a reference frequency signal and responsively generates an adaptive on-time signal based on a difference between the reference frequency signal and the first signal, the adaptive on-time signal instructing the turn-off instant for the first switch corresponding to the target frequency.

4. The control circuit of claim 3, wherein the reference frequency signal corresponds to the target frequency.

5. The control circuit of claim 3, wherein when the switching frequency is higher than the target frequency, the adaptive on-time generator postpones the turn-off instant for the first switch by one unit interval, and when the switching frequency is lower than the target frequency, the adaptive on-time generator advances the turn-off instant for the first switch by one unit interval.

6. The control circuit of claim 3, wherein when the switching frequency is higher than the target frequency, the adaptive on-time generator postpones the turn-off instant for the first switch by a period of time positively correlated to the difference between the target frequency and the switching frequency, and when the switching frequency is lower than the target frequency, the adaptive on-time generator advances the turn-off instant for the first switch by a period of time positively correlated to the difference between the target frequency and the switching frequency.

7. The control circuit of claim 3, wherein the on-time control unit further comprises:
   a current limiter, which receives the second signal and the predefined value, and if the peak value of the current flowing through the first switch reaches the predefined value, generates a current limiting signal; and
   a second logic circuit, which receives the current limiting signal and the adaptive on-time signal, and determines the turn-off instant for the first switch based on the current limiting signal or the adaptive on-time signal, whichever arrives at the second logic circuit first.

8. The control circuit of claim 3, wherein the adaptive on-time generator comprises:
   a frequency error signal generator, which receives the first signal and the reference frequency signal and generates a frequency error signal characterizing the difference between the reference frequency signal and the first signal;
   an on-time adjustment generator, which receives the frequency error signal and generates, based on the frequency error signal, an amount of on-time adjustment to be made to a current period; and
   a timer circuit, which generates the adaptive on-time signal based on the amount of on-time adjustment.

9. The control circuit of claim 8, wherein the amount of on-time adjustment generated based on the frequency error signal causes the timer circuit to postpone the turn-off instant for the first switch when the frequency error signal indicates that the switching frequency is higher than the target frequency and to advance the turn-off instant for the first switch when the frequency error signal indicates that the switching frequency is lower than the target frequency.

10. The control circuit of claim 1, further comprising an off-time control unit, which receives a third signal characterizing the output voltage, compares the third signal with a reference voltage signal, and generates a signal indicative of a turn-on instant for the first switch.

11. The control circuit of claim 10, further comprising a first logic circuit, which receives both the signal indicative of the turn-off instant for the first switch and the signal indicative of the turn-on instant for the first switch and generates a control signal for the first switch.

12. A control system for a switched-mode power supply, the control system comprising a switching element, a freewheeling element and an energy storage element, the control system configured to convert an input voltage into an output voltage, the control system further comprising
   an on-time control unit, which receives a first signal characterizing a switching frequency of the switching element and a second signal characterizing a current flowing through the switching element or the energy storage element and responsively generates a signal indicative of a turn-off instant for the switching element, wherein when a peak value of the current flowing through the switching element or the energy storage element drops below a predefined value, the on-time control unit determines the turn-off instant for the switching element based on the first signal so that the switching frequency of the switching element is maintained at a target frequency.

13. The control system of claim 12, wherein the switched-mode power supply is an isolated switched-mode power supply comprising a primary-side circuit and a secondary-side circuit, which are connected to different ground terminals, wherein the switching element and the on-time control unit are both electrically connected to the primary-side circuit, and the freewheeling element is connected to the secondary-side circuit.

14. The control system of claim 12, wherein the on-time control unit comprises:
   an adaptive on-time generator, which receives the first signal and a reference frequency signal and generates an adaptive on-time signal based on a difference between the reference frequency signal and the first signal, the adaptive on-time signal instructing the turn-off instant for the switching element corresponding to the target frequency;
   a current limiter, which receives the second signal and the predefined value, and if the peak value of the current flowing through the switching element reaches the predefined value, generates a current limiting signal; and
   a second logic circuit, which receives the current limiting signal and the adaptive on-time signal, and determines the turn-off instant for the switching element based on the adaptive on-time signal if the current limiting signal is not yet received when the adaptive on-time signal is received.

15. The control system of claim 14, wherein the switched-mode power supply is an isolated switched-mode power supply comprising a primary-side circuit and a secondary-side circuit, which are connected to different ground terminals, and wherein the switching element, the current limiter and the second logic circuit are all electrically connected to the primary-side circuit, and the adaptive on-time generator is connected to the secondary-side circuit.

16. The control system of claim 12, wherein the switched-mode power supply is a non-isolated switched-mode power supply.

17. A control method for a switched-mode power supply for driving a first switch in the switched-mode power supply to convert an input voltage into an output voltage, the control method comprising: detecting a switching frequency of the first switch and a current flowing through the first switch; when a peak value of the current flowing through the first switch drops below a predefined value, operating the first switch in a frequency-locked mode; in the frequency-locked mode, determining a turn-off instant for the first switch by an on-time control unit, which receives a first signal characterizing a switching frequency of the first switch and a second signal characterizing the current flowing through the first switch and responsively generates a signal indicative of a turn-off instant for the first switch, wherein when a peak value of the current flowing through the first switch drops below a predefined value, the on-time control unit determines the turn-off instant for the first switch based on the first signal so that the switching frequency of the first switch is maintained at a target frequency.

18. The control method of claim 17, wherein when the peak value of the current flowing through the first switch reaches the predefined value, the turn-off instant for the first switch is determined based on the instant of time when the peak value of the current reaches the predefined value.

19. The control method of claim 18, wherein an adaptive on-time signal is generated based on a difference between a reference frequency signal and the first signal, the reference frequency signal corresponding to the target frequency.

20. The control method of claim 19, further comprising:
   receiving the second signal and the predefined value and generating a current limiting signal when the peak value of the current flowing through the first switch reaches the predefined value; and
   if the adaptive on-time signal is generated earlier than the current limiting signal, determining the turn-off instant for the first switch based on the adaptive on-time signal.

21. The control method of claim 17, further comprising:
   in the frequency-locked mode, detecting an on-time length of the first switch, and if the on-time length is less than a predetermined minimum on-time length, quitting the frequency-locked mode and determining the turn-off instant for the first switch based on the predetermined minimum on-time length, or if the on-time length is greater than a maximum on-time length, quitting the frequency-locked mode and determining the turn-off instant for the first switch based on the predetermined maximum on-time length.

* * * * *